March 1, 1955 — T. PETERSEN — 2,703,027
PIPE VISE

Filed Dec. 10, 1952 — 2 Sheets-Sheet 1

INVENTOR
Thorwald Petersen
BY Ralph Hammar
ATTORNEY

INVENTOR
Thorvald Petersen
BY Ralph Hammar
ATTORNEY

United States Patent Office 2,703,027
Patented Mar. 1, 1955

2,703,027
PIPE VISE

Thorvald Petersen, Erie, Pa., assignor to Reed Manufacturing Company, Erie, Pa., a corporation of Pennsylvania Application December 10, 1952, Serial No. 325,070

3 Claims. (Cl. 81—19)

This invention is a chain-type pipe vise in which the tightening thrust is taken through a section of the frame in line with the jaw supports. Another feature is the equilateral triangular jaws carried on an angular support so each jaw can be turned to present any one of its three sides to the pipe.

Figures 1, 2:
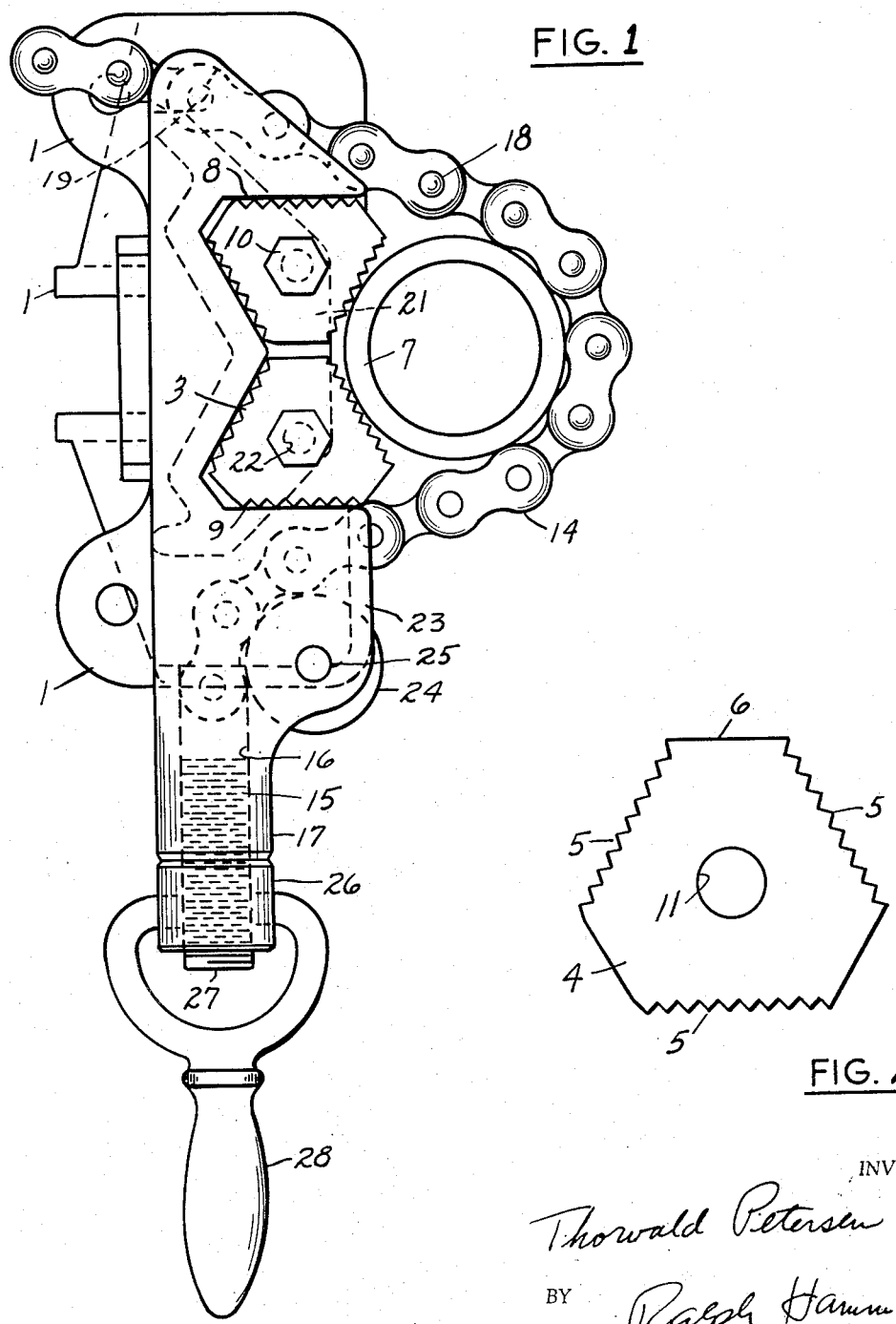
Figure 3:
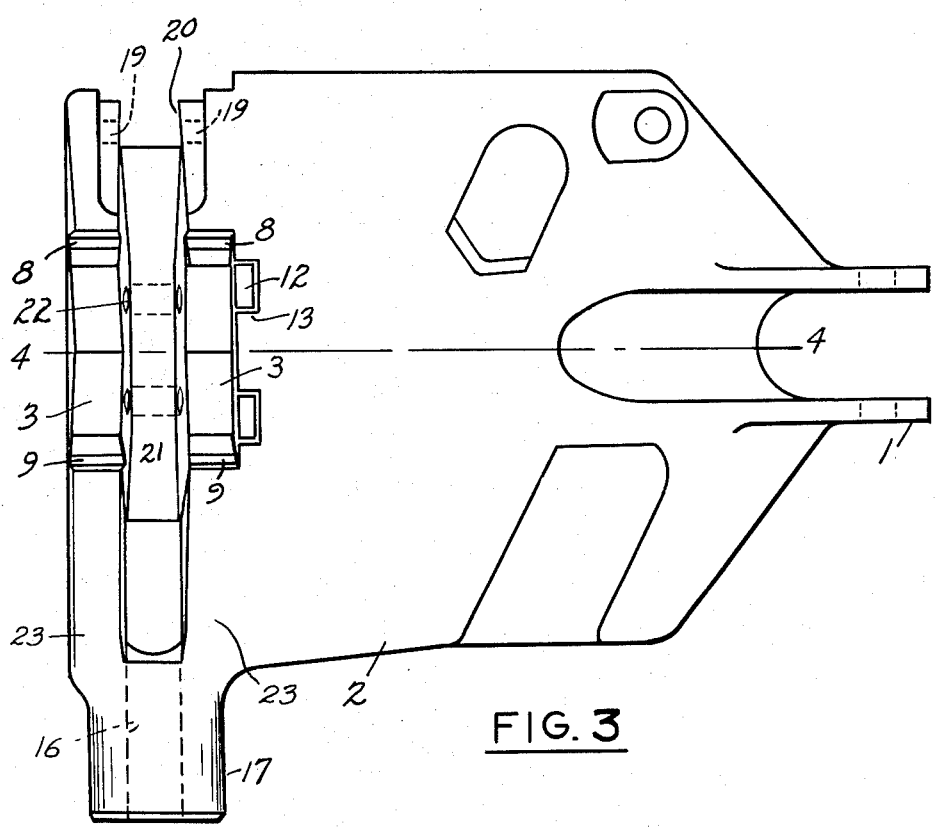
Figure 4:
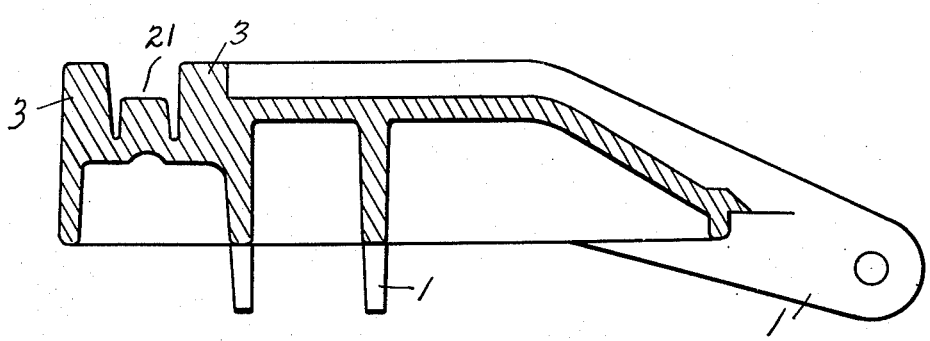

In the accompanying drawings, Fig. 1 is an end elevation of a pipe vise, Fig. 2 is a side view of one of the equilateral pipe gripping jaws, Fig. 3 is a top plan view of the vise frame, and Fig. 4 is a section on line 4—4 of Fig. 3.

The invention is shown applied to a vise adapted for mounting on a stand or tripod through legs which may be suitably attached to lugs 1 depending from the underside of the frame 2 of the vise. Since this is one of the conventional arrangements for supporting a vise the construction need not be further illustrated. At the front of the vise are spaced angular jaw seats 3, each of which receives a pair of equilateral pipe jaws 4. Each of the jaws has gripping teeth 5 on each of its three sides which extend throughout the full length of the sides. When the jaws are arranged on the seats 3 with the blunt apexes 6 of adjacent jaws arranged end-to-end, the upwardly presented sides of the jaws converge at an angle of substantially 120° and provide a toothed gripping surface for a pipe 7. The undersides of the jaws rest on the 120° surface of the seats 3. The faces of the jaws at opposite ends rest against upright surfaces 8 and 9, respectively, at opposite sides of the seats 3. With this arrangement two of the sides of the triangular jaws 4 are used to support the jaws on the vise frame while the third of the sides is used to grip the pipe. The jaws may be easily removed and turned so as to use a different side for gripping the pipe by loosening bolts 10 which extend through central holes 11 in the jaws into nuts 12 which are non-rotatably received in pockets 13 in the vise frame. The ability to interchange the pipe gripping surfaces on the jaws materially increases the jaw life.

The jaw seats 3 are spaced apart a distance slightly greater than the width of a chain 14, one end of which is attached to a pin 15 extending out through a clearance opening 16 in a cylindrical boss 17 and the other end of which is provided with a plurality of projecting pintles 18 any one of which may be hooked in notches 19 on the underside of the vise frame 2 at the opposite side thereof. There is a passageway 20 between the notches 19 through which the opposite end of the chain depends as illustrated in Fig. 1. Between the jaws seats 3 and substantially in line with the cylindrical boss 17 at the opposite side of the vise frame 2 is a stiffening rib 21 extending crosswise of the vise frame. The stiffening rib 21 is drilled at 22 on each side of the central portion for the bolts 10. At the inner end of the boss 17 is a pair of upstanding ears 23 spaced apart so that the chain 14 freely passes therebetween. A guide roller 24 is journaled between the ears on a pin 25 extending between the ears.

In the use of the vise, the pipe 7 is placed on the jaws 4 and the chain 14 is wrapped over the top of the pipe and one of the pintles 18 at the free end hooked in the notches 19 to anchor the chain to the vise frame. The chain is then tightened to pull the pipe 7 down against the jaws by a nut 26 cooperating with the threaded outer end 27 of the pin 15. A swivelled handle 28 is provided for turning the nut. The threaded section 27 of the pin 15 need be only slightly greater than the length of one of the chain links in order to obtain complete tightening of the vise. The guide roller 24 guides the chain into the clearance opening 16 and eliminates friction which might otherwise make the vise hard to tighten.

By having the boss 17 through which the chain is pulled as the vise is tightened substantially in line with the seats for the pipe jaws 4 and the stiffening rib 2 between the jaws, the tightening stresses are taken across the strongest portion of the vise frame which means that the frame need not be made unnecessarily heavy. This is important in chain type vises where the weight should be kept to a minimum. If at any time the upwardly presented teeth 5 on the jaws 4 become worn or broken, the jaws may be easily turned so as to present a new set of gripping teeth to the pipe. This materially increases the useful life of the vise. Not only can the gripping teeth 5 of the jaws be changed by rotating the separate jaws but the jaws can be turned end for end so that if the teeth at one end of the jaws become worn the unworn or lesser worn section of the teeth at the other end can be presented to the pipe.

What is claimed as new is:

1. In a pipe vise, a pair of equilateral triangular jaws arranged with apexes end to end and with upper sides converging downward toward each other to provide gripping surfaces for pipe, a frame having angular jaw supporting seats directly beneath the pipe with sides converging upward and having upright surfaces at each side engaging the sides of the jaws opposite the apexes, and means removably holding the jaws on the seats whereby the jaws may be repositioned to bring other sides into the uppermost or pipe gripping position.

2. In a pipe vise, a pair of equilateral triangular jaws arranged with apexes end to end with the upper sides converging downward toward each other to provide gripping surfaces for pipe and with lower sides converging upwardly toward each other beneath said pipe gripping surfaces, a frame having complementary angular seats with sides converging upwardly toward each other for receiving and supporting said lower sides of the jaws, and means removably holding the jaws on the seats whereby the jaws may be repositioned to bring other sides into the uppermost or pipe gripping position.

3. A chain type pipe vise having a frame with an elongate reinforcing rib extending crosswise of a longitudinal axis of pipe to be gripped by the vise, pipe gripping jaws supported by the frame on each side of the rib, a chain extending over the rib for pulling pipe down against the jaws, a pin attached to one end of the chain, means anchoring the other end of the chain to the frame, a horizontal boss on the frame extending horizontally and having its axis lying parallel to the elongate rib, said boss having a clearance opening therein through which the pin projects, and a nut threaded on the projecting end of the pin for pulling the pin through the boss to tighten the chain against the pipe.

References Cited in the file of this patent

UNITED STATES PATENTS

| | | |
|---|---|---|
| 382,975 | Hagar | May 15, 1888 |
| 1,184,388 | Schubert | May 23, 1916 |
| 1,666,173 | Heide | Apr. 17, 1928 |
| 1,895,445 | Charpiot, Jr. | Jan. 21, 1933 |
| 2,394,709 | Matter | Feb. 12, 1946 |